US012802375B2

(12) United States Patent
Park

(10) Patent No.: US 12,802,375 B2
(45) Date of Patent: *Nov. 17, 2026

(54) COLORED THREE-DIMENSIONAL DIGITAL MODEL GENERATION

(71) Applicant: eBay Korea Co. Ltd., Seoul (KR)

(72) Inventor: Yo Han Park, Seoul (KR)

(73) Assignee: eBay Korea Co. Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,915

(22) Filed: Jun. 19, 2024

(65) Prior Publication Data

US 2024/0338919 A1 Oct. 10, 2024

Related U.S. Application Data

(63) Continuation of application No. 17/863,625, filed on Jul. 13, 2022, now Pat. No. 12,045,944, which is a (Continued)

(51) Int. Cl.

*G06T 19/20* (2011.01)
*G06F 16/583* (2019.01)
(Continued)

(52) U.S. Cl.

CPC .......... *G06T 19/20* (2013.01); *G06F 16/5838* (2019.01); *G06Q 30/0643* (2013.01); (Continued)

(58) Field of Classification Search

CPC ......... G06T 19/20; G06T 15/04; G06T 15/08; G06T 15/205; G06T 13/40; G06T 17/00; (Continued)

(56) References Cited

U.S. PATENT DOCUMENTS 7,272,264 B2 9/2007 Elshishiny
7,538,764 B2 5/2009 Salomie
(Continued)

FOREIGN PATENT DOCUMENTS

CN 201780606 3/2011
CN 105094725 11/2015
(Continued)

OTHER PUBLICATIONS

Wiley et al., Automatic Segmentation of CT scans of Checked Baggage, 201206, ResearchGate (Year: 2012).*
(Continued)

*Primary Examiner* — YuJang Tswei
(74) *Attorney, Agent, or Firm* — FIG. 1 Patents

(57) ABSTRACT

Colored three-dimensional digital model generation techniques and systems are described. In one example, scanning techniques are employed by a scanning system that scans a physical object while disposed within packaging to form a three-dimension digital model. A model coloring system is employed to color the three-dimensional digital model. A two-dimensional digital image is employed that captures the same or similar physical object. In one example, features of the model are matched to the image. This is then used to align a viewing perspective with respect to the model with a viewing perspective of the object within the digital image, e.g., to find which "view" of the model corresponds with the image. The color is then applied from the digital image to the model, e.g., from pixels of the image to corresponding points in the model.

20 Claims, 10 Drawing Sheets

Related U.S. Application Data continuation of application No. 16/928,138, filed on Jul. 14, 2020, now Pat. No. 11,423,631, which is a continuation of application No. 15/996,289, filed on Jun. 1, 2018, now Pat. No. 10,740,983.

(51) Int. Cl.

| | |
|---|---|
| ***G06Q 30/06*** | (2023.01) |
| ***G06Q 30/0601*** | (2023.01) |
| ***G06T 13/40*** | (2011.01) |
| ***G06T 15/04*** | (2011.01) |
| ***G06T 15/08*** | (2011.01) |
| ***G06T 15/20*** | (2011.01) |
| ***G06T 15/50*** | (2011.01) |
| ***G06T 17/00*** | (2006.01) |

(52) U.S. Cl.

CPC .............. *G06T 13/40* (2013.01); *G06T 15/04* (2013.01); *G06T 15/08* (2013.01); *G06T 15/205* (2013.01); *G06Q 30/06* (2013.01); *G06T 15/20* (2013.01); *G06T 15/50* (2013.01); *G06T 17/00* (2013.01); *G06T 2219/2012* (2013.01)

(58) Field of Classification Search

CPC . G06T 2219/2012; G06T 15/50; G06T 15/20; G06F 16/5838; G06Q 30/0643; G06Q 30/06

See application file for complete search history.

(56) References Cited

U.S. PATENT DOCUMENTS

| | | | | |
|---|---|---|---|---|
| 7,558,439 | B2 | 7/2009 | Weese et al. | |
| 8,253,746 | B2 | 8/2012 | Geisner et al. | |
| 8,340,245 | B2 | 12/2012 | Herrnaz et al. | |
| 9,292,961 | B1 | 3/2016 | Korchev et al. | |
| 9,443,346 | B2 * | 9/2016 | Ikits | G03B 42/026 |
| 9,686,481 | B1 * | 6/2017 | Graybill | H04N 7/18 |
| 9,799,147 | B1 | 10/2017 | Chehadeh | |
| 10,192,115 | B1 | 1/2019 | Sheffield et al. | |
| 10,521,515 | B2 * | 12/2019 | Voris | B29C 64/386 |
| 10,607,413 | B1 | 3/2020 | Marcolina et al. | |
| 10,699,421 | B1 | 6/2020 | Cherevatsky et al. | |
| 10,740,983 | B2 | 8/2020 | Park | |
| 10,878,623 | B2 | 12/2020 | Blackley et al. | |
| 11,423,631 | B2 | 8/2022 | Park | |
| 11,529,762 | B2 | 12/2022 | Bigos et al. | |
| 11,654,633 | B2 | 5/2023 | Bigos | |
| 12,045,944 | B2 | 7/2024 | Park | |
| 2002/0139853 | A1 * | 10/2002 | Tsikos | G06K 7/10732 235/462.01 |
| 2004/0227752 | A1 | 11/2004 | McCartha et al. | |
| 2005/0069682 | A1 | 3/2005 | Tseng | |
| 2005/0226527 | A1 | 10/2005 | Weese et al. | |
| 2007/0217672 | A1 | 9/2007 | Shannon et al. | |
| 2007/0276214 | A1 * | 11/2007 | Dachille | G16H 30/40 600/407 |
| 2008/0219538 | A1 | 9/2008 | Gering | |
| 2009/0034790 | A1 | 2/2009 | Song et al. | |
| 2012/0093367 | A1 | 4/2012 | Gudmundson et al. | |
| 2012/0177284 | A1 | 7/2012 | Wang | |
| 2012/0242790 | A1 | 9/2012 | Sandrew et al. | |
| 2013/0170723 | A1 * | 7/2013 | Kwon | G06T 7/155 382/131 |
| 2013/0188830 | A1 | 7/2013 | Ernst et al. | |
| 2013/0249901 | A1 | 9/2013 | Sweet et al. | |
| 2013/0250050 | A1 * | 9/2013 | Kanaujia | H04N 13/106 348/42 |
| 2013/0293539 | A1 * | 11/2013 | Hunt | G01B 11/00 345/420 |
| 2014/0114461 | A1 | 4/2014 | Hermary et al. | |
| 2015/0022522 | A1 * | 1/2015 | Li | G06T 19/00 345/424 |
| 2015/0046291 | A1 | 2/2015 | Archambault | |
| 2015/0172637 | A1 | 6/2015 | Yoon et al. | |
| 2015/0178988 | A1 | 6/2015 | Mora et al. | |
| 2015/0186418 | A1 * | 7/2015 | Harp | G06F 16/5854 707/723 |
| 2015/0206345 | A1 | 7/2015 | Chang et al. | |
| 2015/0332498 | A1 | 11/2015 | Zhang et al. | |
| 2015/0348312 | A1 | 12/2015 | Nowak et al. | |
| 2015/0363971 | A1 | 12/2015 | Pan et al. | |
| 2016/0012646 | A1 * | 1/2016 | Huang | G06T 19/20 345/419 |
| 2016/0124934 | A1 | 5/2016 | Greenberg et al. | |
| 2016/0189288 | A1 | 6/2016 | Todeschini et al. | |
| 2016/0198142 | A1 | 7/2016 | Sandrew et al. | |
| 2016/0206203 | A1 | 7/2016 | Yu et al. | |
| 2016/0239080 | A1 | 8/2016 | Marcolina et al. | |
| 2017/0032579 | A1 | 2/2017 | Eisemann et al. | |
| 2017/0106591 | A1 | 4/2017 | Tabayashi | |
| 2017/0132485 | A1 | 5/2017 | Ying et al. | |
| 2017/0212661 | A1 * | 7/2017 | Ito | G06F 3/0482 |
| 2017/0320346 | A1 | 11/2017 | Zhou et al. | |
| 2017/0323376 | A1 | 11/2017 | Glaser et al. | |
| 2018/0047193 | A1 * | 2/2018 | Gao | G06T 7/248 |
| 2018/0089819 | A1 | 3/2018 | Jimenez | |
| 2018/0095450 | A1 | 4/2018 | Lappas et al. | |
| 2018/0114264 | A1 | 4/2018 | Rafii et al. | |
| 2018/0114363 | A1 | 4/2018 | Rosenbaum | |
| 2018/0144458 | A1 | 5/2018 | Xu et al. | |
| 2018/0321658 | A1 * | 11/2018 | Whitmarsh | G05B 19/4099 |
| 2018/0342109 | A1 | 11/2018 | Hamidi-Rad et al. | |
| 2019/0371078 | A1 | 12/2019 | Park | |
| 2020/0342688 | A1 | 10/2020 | Park | |
| 2021/0182983 | A1 | 6/2021 | Jalla | |

FOREIGN PATENT DOCUMENTS

| | | | |
|---|---|---|---|
| CN | 119180902 | A | 12/2024 |
| EP | 2381421 | | 10/2011 |
| KR | 20160001699 | | 1/2016 |
| WO | WO-2017158592 | | 9/2017 |
| WO | WO-2018017626 | | 1/2018 |
| WO | WO-2019231740 | | 12/2019 |

OTHER PUBLICATIONS

Applicant Interview summary received for U.S. Appl. No. 15/996,289, mailed Mar. 2, 2020, 3 Pages.

Applicant Interview summary received for U.S. Appl. No. 15/996,289, mailed Sep. 25, 2019, 3 pages.

Communication pursuant to Article 94(3) EPC for Application No. 19731017.0, Mailed Aug. 22, 2022, 6 pages.

Communication Pursuant to Article 94(3) EPC Received for EP Application No. 19731017.0, mailed May 26, 2023, 6 pages.

Corrected Notice of Allowability issued in U.S. Appl. No. 16/928,138, mailed May 20, 2022, 2 pages.

Corrected Notice of Allowability issued in U.S. Appl. No. 17/863,625, mailed May 9, 2024, 2 pages.

Final Office Action issued in U.S. Appl. No. 15/996,289, mailed Jan. 15, 2020, 27 pages.

Final Office Action issued in U.S. Appl. No. 16/928,138, mailed Mar. 10, 2021, 34 pages.

Final Office Action issued in U.S. Appl. No. 16/928,138, mailed Oct. 20, 2021, 38 pages.

Final Office Action issued in U.S. Appl. No. 17/863,625, mailed Jan. 5, 2024, 15 pages.

Final Office Action issued in U.S. Appl. No. 17/863,625, mailed May 17, 2023, 39 pages.

Foreign Notice of Allowance issued in KR 10-2020-7030266, mailed Aug. 24, 2022, 8 pages.

Foreign Office Action issued in CN 201980036853.1, mailed Feb. 7, 2024, 21 pages.

Foreign Office Action issued in KR 10-2020-7030266, mailed Feb. 15, 2022, 7 pages.

(56) References Cited

OTHER PUBLICATIONS

Foreign Office Action issued in KR 10-2022-7040296, mailed Jan. 29, 2024, 5 pages.
Foreign Office Action issued in KR 10-2022-7040296, mailed Jul. 25, 2023, 7 pages.
International Preliminary Report on Patentability Received for Application No. PCT/US2019/033163, mailed Dec. 10, 2020, 9 pages.
International Search Report and Written Opinion for Application No. PCT/US2019/033163, mailed Sep. 30, 2019, 13 pages.
Lumencandela, "3.1 Position, Displacement, and Average Velocity", Lumencandela, 2013, 11 Pages.
Non-Final Office Action issued in 16/928, 138, mailed Nov. 25, 2020, 30 pages.
Non-Final Office Action issued in U.S. Appl. No. 15/996,289, mailed Aug. 5, 2019, 21 pages.
Non-Final Office Action issued in U.S. Appl. No. 16/928,138 mailed Jan. 5, 2022, 35 pages.
Non-Final Office Action issued in U.S. Appl. No. 16/928,138, mailed May 12, 2021, 35 pages.
Non-Final Office Action issued in U.S. Appl. No. 17/863,625, mailed Aug. 3, 2023, 44 pages.
Non-Final Office Action issued in U.S. Appl. No. 17/863,625, mailed Nov. 22, 2022, 35 pages.
Notice of Allowance issued in U.S. Appl. No. 15/996,289, mailed Apr. 2, 2020, 8 pages.
Notice of Allowance issued in U.S. Appl. No. 16/928,138, mailed Apr. 13, 2022, 8 pages.
Notice of Allowance issued in U.S. Appl. No. 17/863,625, mailed Mar. 21, 2024, 7 pages.
Response to Final Office Action filed Mar. 9, 2020 for U.S. Appl. No. 15/996,289, mailed Jan. 15, 2020, 15 pages.
Response to Non-Final Office Action Filed Oct. 29, 2019 for U.S. Appl. No. 15/996,289, mailed Aug. 5, 2019, 16 pages.
Willis et al., "InfraStructs: Fabricating Information Inside Physical Objects for Imaging in the Terahertz Region", ACM Transactions on Graphics, vol. 32, No. 4, Jul. 21, 2013, 10 pages.
WSP, "Amazon Just Found a Way to Let You See Inside the Box Without Opening It (AMZN)", Wall Street Pit, Nov. 21, 2016 [retrieved May 17, 2023], 5 pages. Retrieved from: < https://wallstreetpit.com/112363-amazon-see-inside-box-without-opening-amzn/>.

* cited by examiner

COLORED THREE-DIMENSIONAL DIGITAL MODEL GENERATION

RELATED APPLICATIONS

This application is a continuation of and claims priority to U.S. patent application Ser. No. 17/863,625, filed on Jul. 13, 2022, which is a continuation of and claims priority to U.S. patent application Ser. No. 16/928,138, filed on Jul. 14, 2020, which is a continuation of and claims priority to U.S. patent application Ser. No. 15/996,289, filed on Jun. 1, 2018, the disclosures of which are incorporated in their entirety by reference here.

BACKGROUND

Three-dimensional digital models have been developed to increase the ways in which a user may interact with digital content via a computing device. A three-dimensional digital model, for instance, may be configured to support user interaction to change a perspective used to view the model by the computing device. As a result, user interaction via the computing device with the three-dimensional digital model may mimic in a way in which the user interactions occur with respect to an actual physical object. This acts to increase richness in user interaction over two-dimensional digital images in that the user may efficiently navigate between these perspectives in a non-modal manner, as opposed to navigating between different views supported by different two-dimensional digital images.

Conventional techniques used to create three-dimensional digital models, however, are complicated, computationally expensive, and typically involve significant amounts of user interaction and expertise, thus making these conventional techniques unavailable to average users. Additionally, formation of the model may in some instances harmfully impact a user's intent in creation of the model. For instance, suppose a user wishes to sell a vintage toy in its original packaging. Inclusion of the toy in the packaging oftentimes increases a monetary value of the toy as a whole. Therefore, use of a conventional modeling technique that involves removal of the toy from the packaging may adversely impact this monetary value and run counter to the user's wishes in selling the toy. Accordingly, conventional modeling techniques may not be available to the user, such as to provide a three-dimensional digital model as part of digital content offering the toy for sale.

SUMMARY

Colored three-dimensional digital model generation techniques and systems are described. In one example, scanning techniques are employed by a scanning system that scans a physical object while disposed within packaging to form a three-dimension digital model. A model coloring system is employed to color the three-dimensional digital model. To do so, a two-dimensional digital image is employed that captures the same or similar physical object. A variety of techniques are usable to apply color of the digital image to the model. In one example, features of the model are matched to the image. This is then used to align a viewing perspective with respect to the model with a viewing perspective of the object within the digital image, e.g., to find which "view" of the model corresponds with the image. The color is then applied from the digital image to the model, e.g., from pixels of the image to corresponding points in the model. In one example, distortion techniques are used to stretch and compress corresponding portions of the digital image to supply this color. Other examples include stereo matching of uncolored portions of the initial version of the model to colored portions of the initial version, patch matching techniques, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
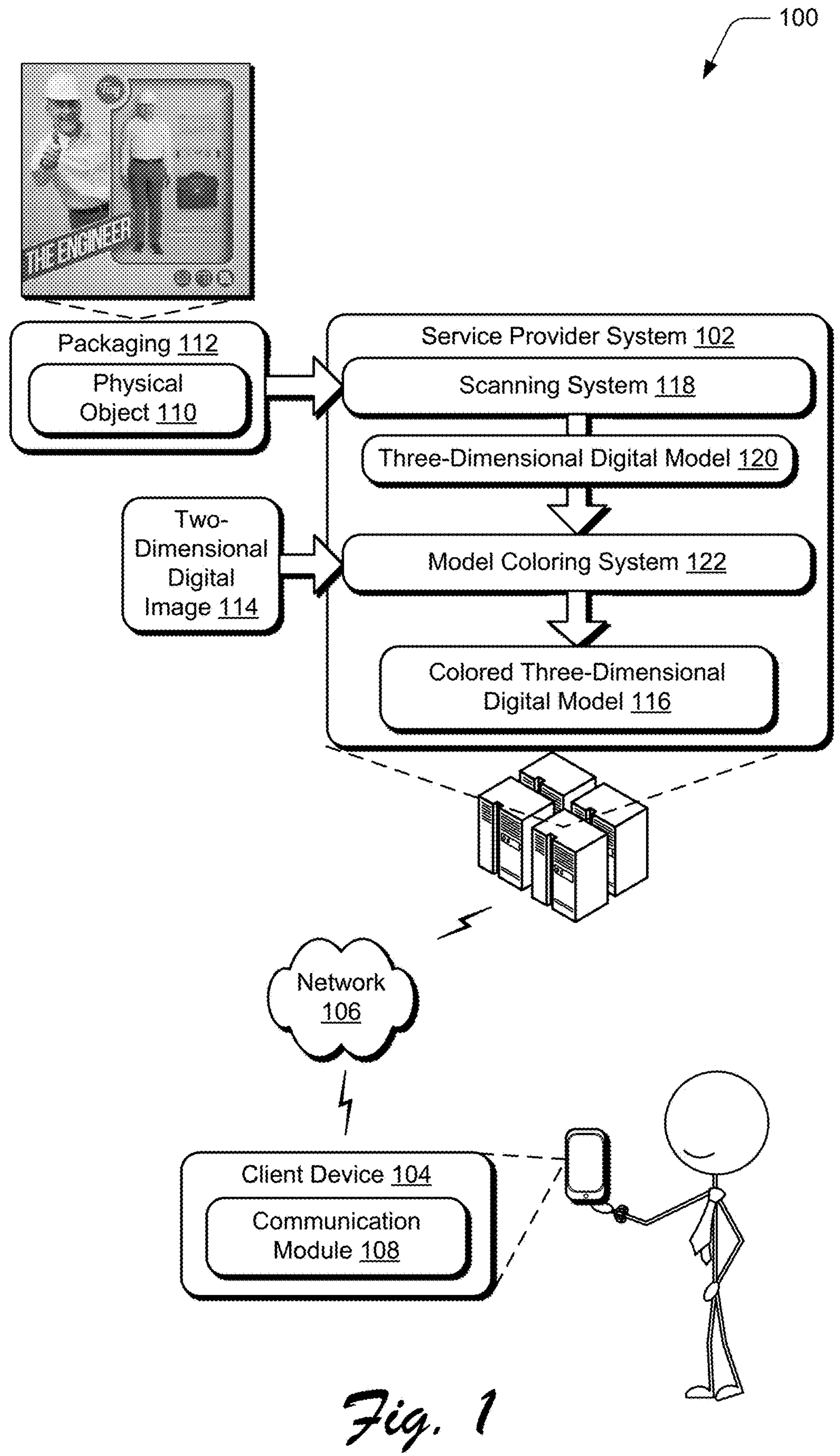
FIG. 1 is an illustration of an environment in an example implementation that is operable to employ colored three-dimensional digital model generation techniques described herein.

Conventional techniques used to create three-dimensional digital models are complicated, computationally expensive, and typically involve significant amounts of user interaction and expertise. This causes these conventional techniques unavailable to average users. Additionally, formation of the three-dimensional digital model may in some instances harmfully impact a user's intent in creation of the model, e.g., may require removal from packaging that may adversely affect a value of a physical object that is to be modeled.

Accordingly, colored three-dimensional digital model generation techniques and systems are described. In one example, scanning techniques are employed by a scanning system that scans a physical object while disposed within packaging. Examples of such scanning techniques include X-ray techniques which generate scanning data as a series of "slices" which are then formed together to generate a three-dimensional digital model of the physical object, directly. Indirect examples are also contemplated in which the scanning data is used to identify a three-dimensional digital model that was previously generated.

Once the three-dimensional digital model is obtained, a model coloring system is employed to color the three-dimensional digital model. To do so, a two-dimensional digital image is employed. In one example, the two-dimensional digital image is provided to the system by a user that initiated the model generation process. The digital image, for instance, may capture a view of the same or similar physical object that is a subject of the model. In another example, the two-dimensional digital image is obtained via a search based at least in part on a search query generated from the three-dimensional digital model, e.g., through shape matching.

Once the two-dimensional digital image is obtained, a variety of techniques are usable to apply color to the digital image to the model. In one example, features of the model are matched to the image. This is then used to align a viewing perspective with respect to the model with a viewing perspective of the object within the digital image, e.g., to find which "view" of the model corresponds with the image. The color is then applied from the digital image to the model, e.g., from pixels of the image to corresponding points in the model.

In some instance, some portions of the model are not viewable in the digital image and are thus not colored in an initial version of the model. Accordingly, techniques may also be employed to color these portions. In one example, distortion techniques are used to stretch and compress corresponding portions of the digital image to supply this color. Other examples include stereo matching of uncolored portions of the initial version of the model to colored portions of the initial version, patch matching techniques, and so forth. In this way, even though a single perspective of the object may be captured by the digital image, this perspective may still be used by the color generation system to provide colors for "unseen" portions of the model. Other examples are also contemplated, such as linear blend skinning.

The colored three-dimensional digital model of the physical object may then be used to support a variety of functionality. A seller, for instance, may wish to offer a physical object within packaging for sale. To do so, the seller interacts with a service provider system to initiate generation of digital content indicating the physical object is available for sale, a two-dimensional digital image of the same or similar physical object, a purchase price, and having functionality that is selectable by a buyer to initiate purchase of the physical object.

The seller then ships the physical object, within the packaging, to a fulfillment center. The fulfillment center includes a scanning system including a three-dimensional scanning device that is usable to generate a three-dimensional digital model. The three-dimensional scanning device is configured to generate scanning data that is used to form the model without removing the physical object from the packaging, thus preserving human and operational resources as well as preserving potentially desirable packaging.

A model coloring system at the fulfillment center is then used to color the three-dimensional digital model based at least in part on the two-dimensional digital image supplied by the seller. In this way, a colored three-dimensional digital model may be readily generated for inclusion as part of the digital content, e.g., the offer to sell the physical object. As a result, the digital content may include a colored three-dimensional digital model without removing the physical object from the packaging, which is not possible using conventional techniques. Other examples are also contemplated, further discussion of which may be found in the following sections and is shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ model generation techniques described herein. The illustrated environment 100 includes a service provider system 102 and a client device 104 of a user that are communicatively coupled, one to another, via a network 106. The client device 104, for instance, may include a communication module 108 that is configured to access functionality of the service provider system 102 via the network 106. The communication module 108 may be configured in a variety of ways, such as a browser, mobile application, and so forth. Computing devices that implement the service provider system 102 and the client device 104 may also be configured in a variety of ways.

A computing device, for instance, may be configured as a desktop computer, a laptop computer, a mobile device (e.g., assuming a handheld configuration such as a tablet or mobile phone as illustrated for the client device 104), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as illustrated for the service provider system 102 and as described in relation to FIG. 9.

The service provider system 102 is configured in this example to process a physical object 110 within packaging 112 and a two-dimensional digital image 114 to form a colored three-dimensional digital model 116. To do so, a scanning system 118 is employed to generate a three-dimensional digital model 120, e.g., through use of X-ray techniques. Although the scanning system 118 is implemented by the service provider system 102 in this example, the scanning system 118 may also be configured as a "stand alone" unit for use by a user, directly. A model coloring system 122 is employed to color the three-dimensional digital model 120 using a two-dimensional digital image 114 thereby forming the colored three-dimensional digital model 116. In this way, the model may be formed from the physical object 110 without removal from the packaging 112, thereby improving efficiency in that repackaging of the physical object 110 is not required and may also be used to preserve potentially valuable packaging.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Colored Three-Dimensional Digital Model Generation

Figure 2:
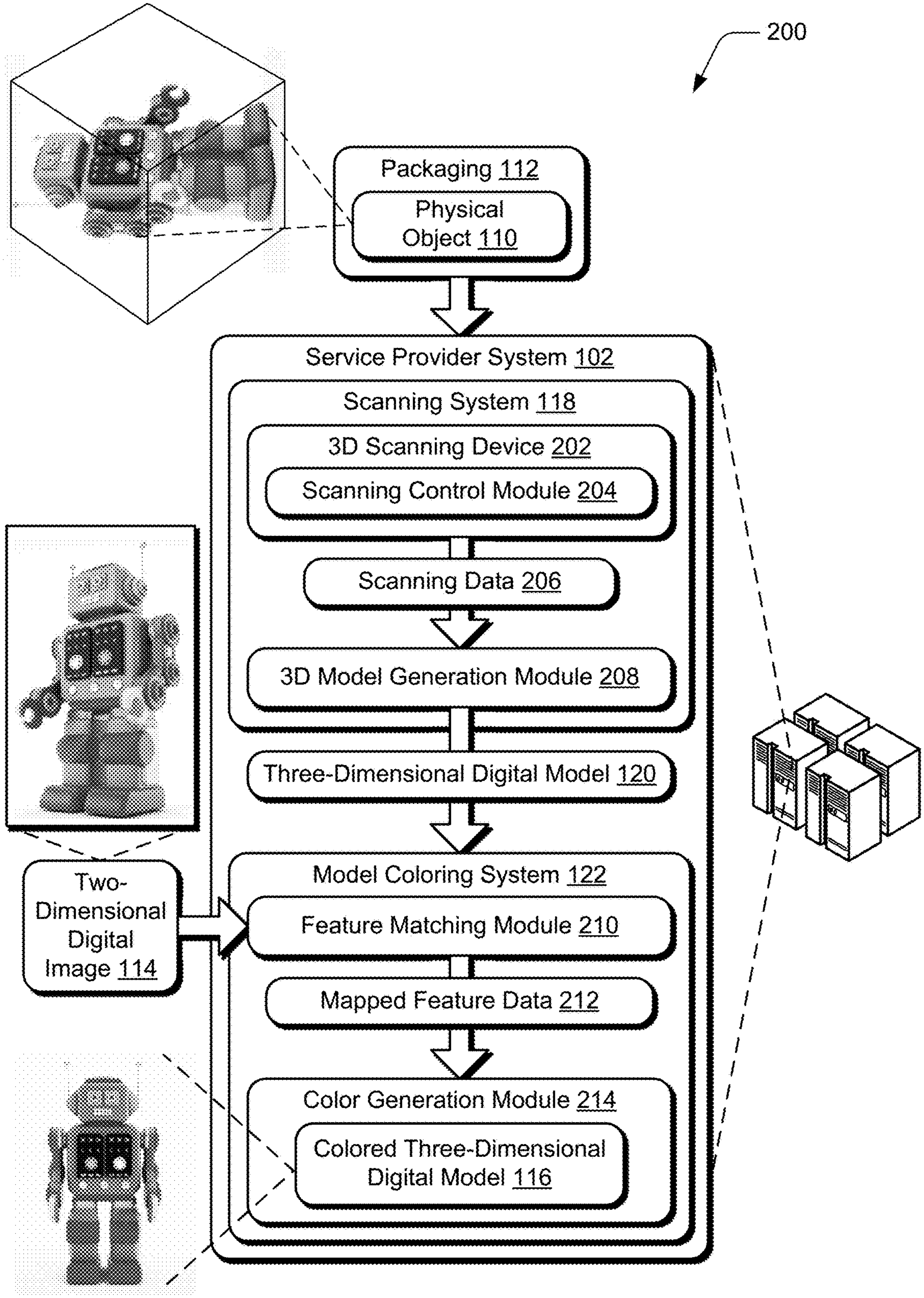
FIG. 2 depicts operation of a scanning system and model color system of FIG. 1 in greater detail.

FIG. 2 depicts a system 200 showing operation of the scanning system 118 and model coloring system 122 of FIG. 1 in greater detail. FIGS. 3-7 depict further examples of operation of the scanning system and model coloring system of FIG. 2. FIG. 8 depicts a procedure 800 in an example implementation in which a three-dimensional digital model formed by scanning a physical object through packaging is colored using a two-dimensional digital image.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-8 interchangeably.

To begin, a physical object 110 contained within packaging 112 is received by the service provider system 102. The packaging 112 may partially obstruct an ability to view of the physical object 110 as shown in FIG. 1 or even fully obstruct an ability to view the physical object 110 as shown in FIG. 2. Accordingly, a 3D scanning device 202 including a scanning control module 204 is configured to generate scanning data 206, through the packaging 112, that describes the physical object 110.

Figure 3:
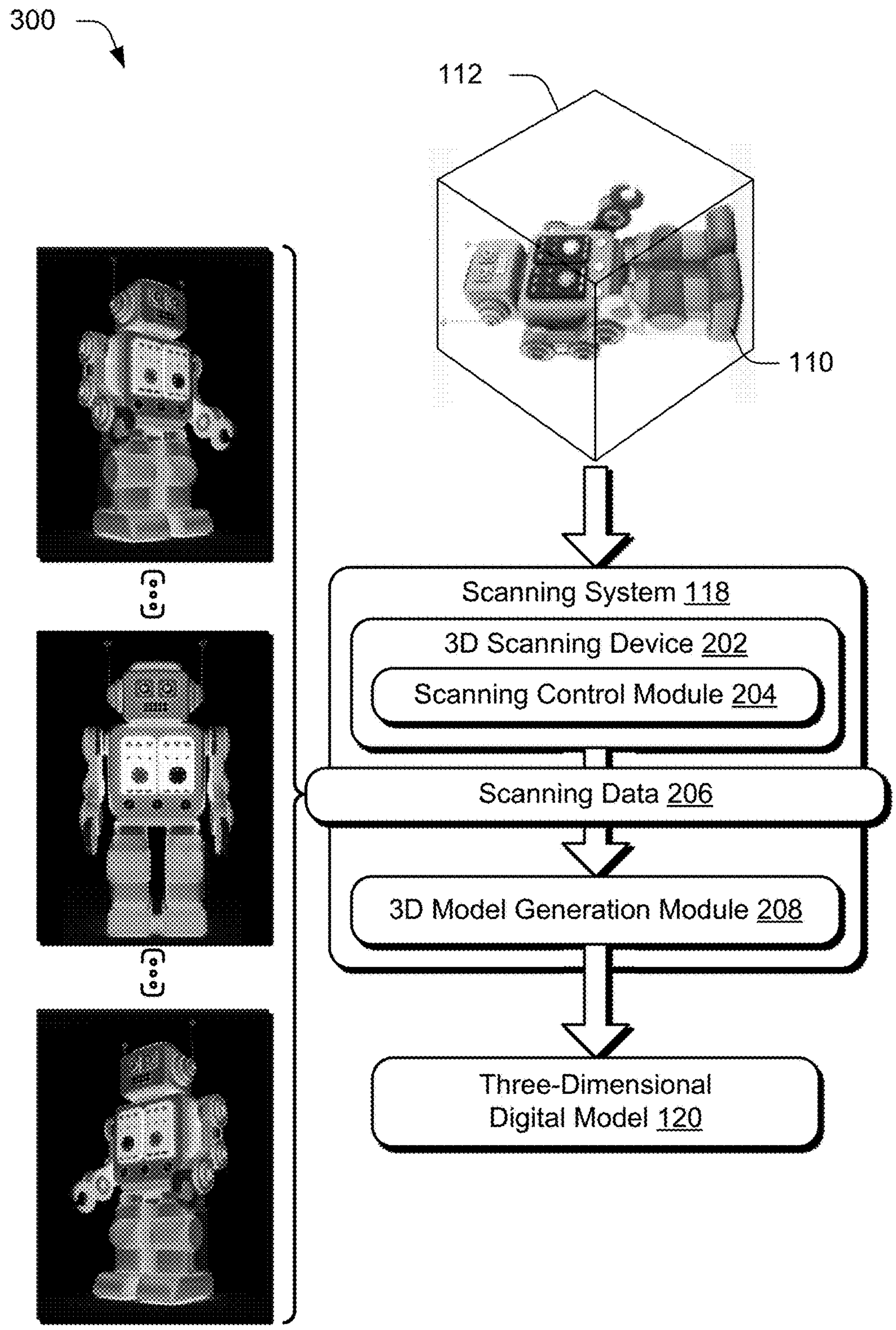
FIG. 3 depicts operation of a scanning system of FIG. 2 in greater detail as generating a three-dimensional digital model by scanning a physical object through packaging.
Figure 4:
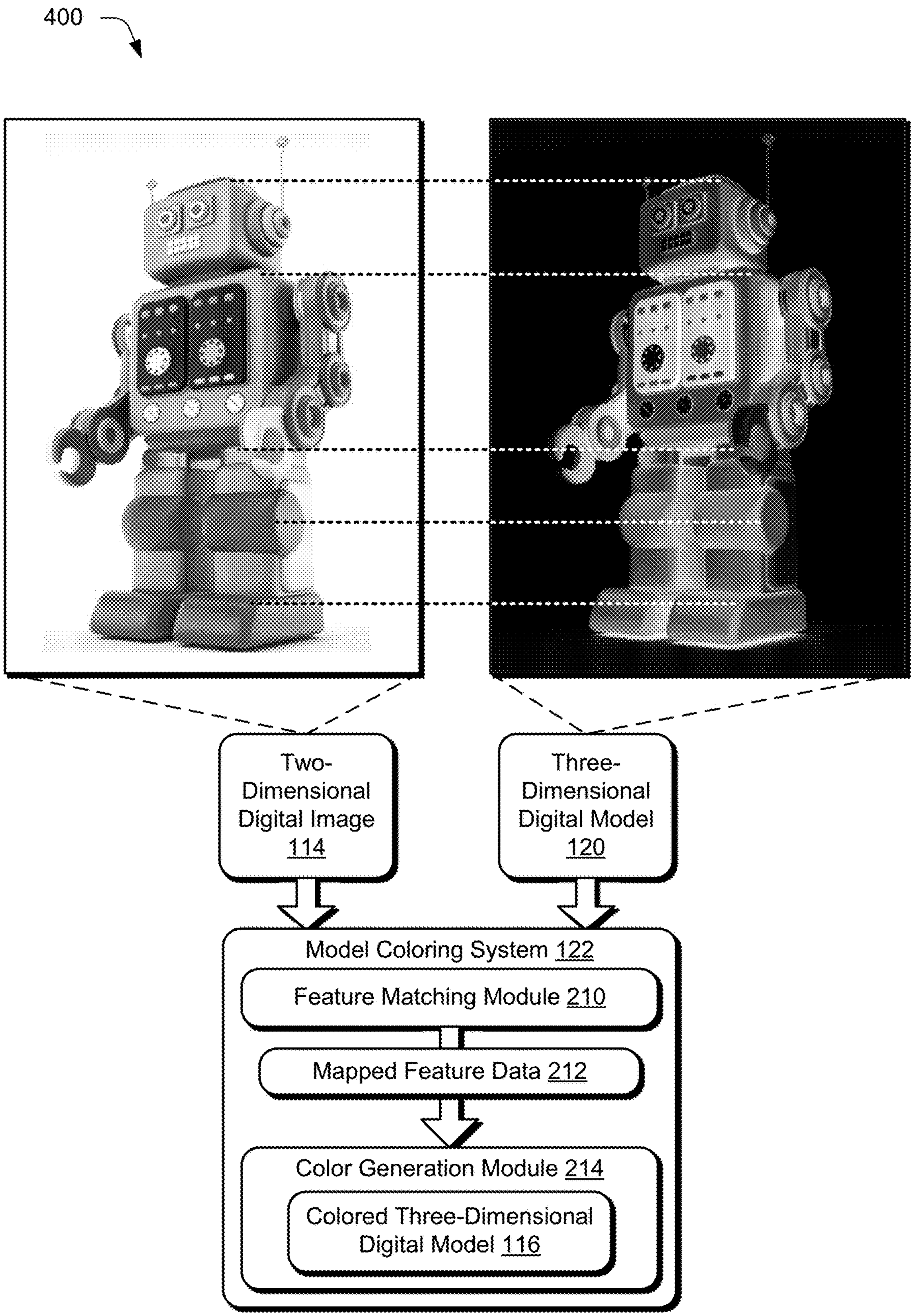
FIG. 4 depicts operation of a model coloring system as employing feature matching between a two-dimensional digital image and the three-dimensional digital model generated in FIG. 3.

As shown in an example implementation 300 of FIG. 3, for instance, the scanning data 206 may capture a variety of views/perspectives of the physical object 110 through the packaging 112. The 3D scanning device 202, for instance, may be configured to generate the scanning data 206 as a collection of two-dimensional X-ray images. The scanning data 206 is able to capture views of the physical object 110 through the packaging 112 because the physical object 110 has a material density that is greater than a material density of the packaging. In one example, densities of packaging materials (e.g., vinyl, Styrofoam, paper, and so on) are estimated, which may then be removed automatically and without user intervention from the scanning data 206 by the system. Other examples are also contemplated, including computed tomography, magnetic resonance imaging, and so forth.

The scanning data 206 that results from a scan of the physical object 110 within the packaging 112 is then received by a three-dimensional digital model generation module 208 (block 802). The three-dimensional digital model generation module 208 is configured to generate a three-dimensional digital model 120 the physical object based on the received scanning data (block 804). The three-dimensional digital model 120, for instance, may be formed as a discrete 3D volumetric representation of the physical object 110 from the scanning data 206 captured from the different perspectives using a variety of techniques, such as an isosurface extraction algorithm.

Thus, at this point the scanning system 118 outputs a three-dimensional digital model 120 of the physical object 110. Because the three-dimensional digital model 120 is formed of the physical object 110 through the packaging 112, the model is not colored. Accordingly, a model coloring system 122 is then employed to color the three-dimensional digital model 120. This may be performed in a variety of ways.

In the illustrated example of FIG. 2, a two-dimensional digital image 114 is received (block 806) of the same or similar physical object 110 by the model coloring system 122 along with the there-dimensional model 120 from the scanning system 118. A user that provided the physical object 110 and packaging 112 to the service provider system 102, for instance, may also provide the two-dimensional digital image 114. In another example, the two-dimensional digital image 114 is obtained by the model coloring system 122 based on an image search, e.g., to find a two-dimensional digital image 114 based on a shape of the three-dimensional digital model 120.

A feature matching module 210 is then employed to detect features of the two-dimensional digital image 114 that correspond to features of the three-dimensional digital model 120 (block 808), which is output as mapped feature data 212. As shown in the example implementation 400 of FIG. 4, the feature matching module 210 may generate the mapped feature data 212 in a variety of ways. The feature matching module 210, for instance, may form abstractions of information in the two-dimensional digital image 114 and the three-dimensional digital model 120 to make local decisions (e.g., at a pixel level) whether a feature is included at the location, and if so, whether that feature may also be found in the model, and vice versa. This may be performed using edge detection, corners and points of interest, through blob detection, and so forth. Edges are points formed as a boundary between two image regions, e.g., through gradient detection, such as between different parts of the illustrated toy robot. Corners and points of interest refer to point-like features in an image that have a local two-dimensional structure, e.g., the buttons on the chest of the toy robot. Blobs provide a description of structure included in the image as regions (e.g., the feet of the toy robot), as contrasted with the corners in the previous example.

This may also be used to modify position of scanned images and/or the three-dimensional digital model 120. For example, points may be identified in the physical object that may move, e.g., flex, rotate, hinged, and so forth. By identifying the relevant points of these different parts (e.g., through object recognition), the three-dimensional digital model 120 may be mapped to the two-dimensional digital image, even if in different poses, or vice versa. For example, the illustrated robot may be included in packaging with arms and legs positioned straight, which are then mapped to a three-dimensional digital model 120 with the arms outstretched. This may include an ability of the system and/or user to modify the model once formed, e.g., to reposition the appendages. This may also include an ability to include accessories as part of the model, e.g., a sword included in the packaging to be held in the hand of the robot. This functionality may be implemented manually through user interaction with a user interface and/or automatically and without user intervention by the system, e.g., based on an image repository of other digital images and/or models.

Figure 5:
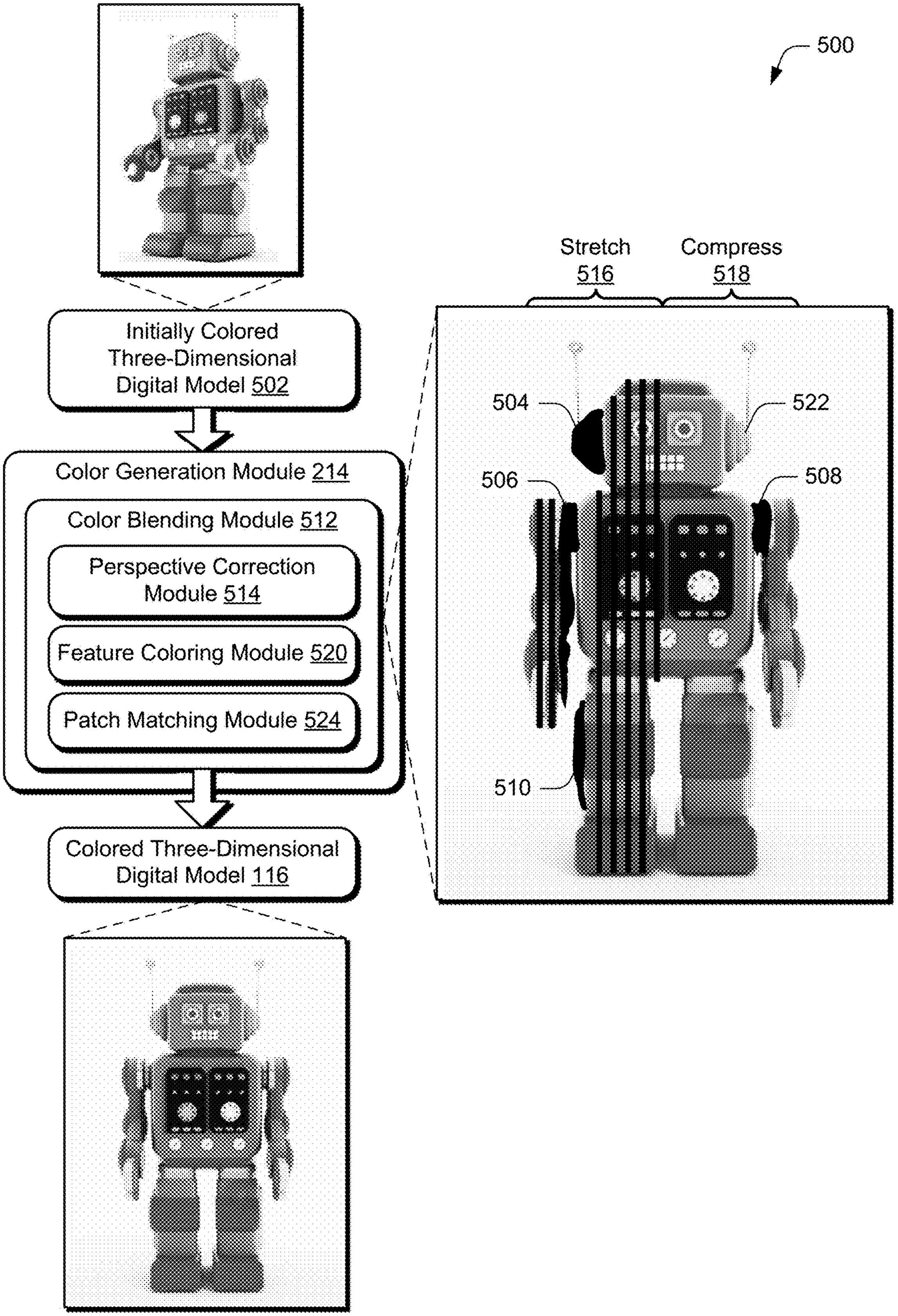
FIG. 5 depicts operation of a model coloring system to color the three-dimensional digital model.

Color is then generated by the model coloring system 122 for the three-dimensional digital model (block 810) based on the detected features to generate the colored three-dimensional digital model 116. This may be performed in a variety of ways. FIG. 5 depicts an example 500 of application of color from the two-dimensional digital image 114 to the three-dimensional digital model 120. To begin, the color generation module first generates an initially colored three-dimensional digital model 502 by aligning a perspective of the three-dimensional digital model 120 with a perspective of the physical object in the two-dimensional digital image 114. The mapped feature data 212 is then used to map colors from the digital image to the model for portions of the physical object that are viewable in the two-dimensional digital image 114.

As illustrated, this may cause portions of the initially colored three-dimensional digital model 502 to lack color. A right earpiece 504, arm joints 506, 508, and right side 510 of the right leg of the toy robot may not be viewable in the two-dimensional digital image 114 that serves as a basis for the color. This may be due to occlusion by other portions of the model, perspective, and so forth. Accordingly, a color blending module 512 is utilized by the color generation module 214 to color these missing portions, which may be performed in a variety of ways.

In a first example, a perspective correction module 514 is employed to stretch 516 and compress 518 respective portions of color obtained from the two-dimensional digital image to apply color to the portions that are not colored due to changes in perspective with respect to the model.

In another example, a feature coloring module 520 is employed to color features that are not colored in the initially colored three-dimensional digital model 502 based on similarity to features that are colored in the model, e.g., the right earpiece 504 that is not colored based on similarity to a left earpiece 522 of the toy robot. Feature similarity may also leverage stereo correspondence, e.g., to color a right side of the toy robot based on bilateral similarity of the right side to the colored left side of the toy robot in the illustrated example.

In a further example, a patch matching module 524 is employed. In patch matching, a nearest neighbor field of offsets of a patch for image similarity as a measure of distance are used for "hole filling" the missing portions of the initially colored three-dimensional digital model 502. This may be based on patches taken from colored portions of the initially colored three-dimensional digital model 502 and/or the two-dimensional digital image. Thus, the color generation module 214 may employ a variety of techniques to generate color for the colored three-dimensional digital model 116.

The colored three-dimensional digital model 116 is output by the model coloring system 122 as supporting user interaction via a user interface involving a change a viewing perspective in relation to the colored three-dimensional digital model 116 (block 812). The colored three-dimensional digital model 116 may thus support increased richness in user interactions over conventional modal techniques that required user navigation through different two-dimensional digital images to see a representation of a physical object 110 from different angles.

Figure 6:
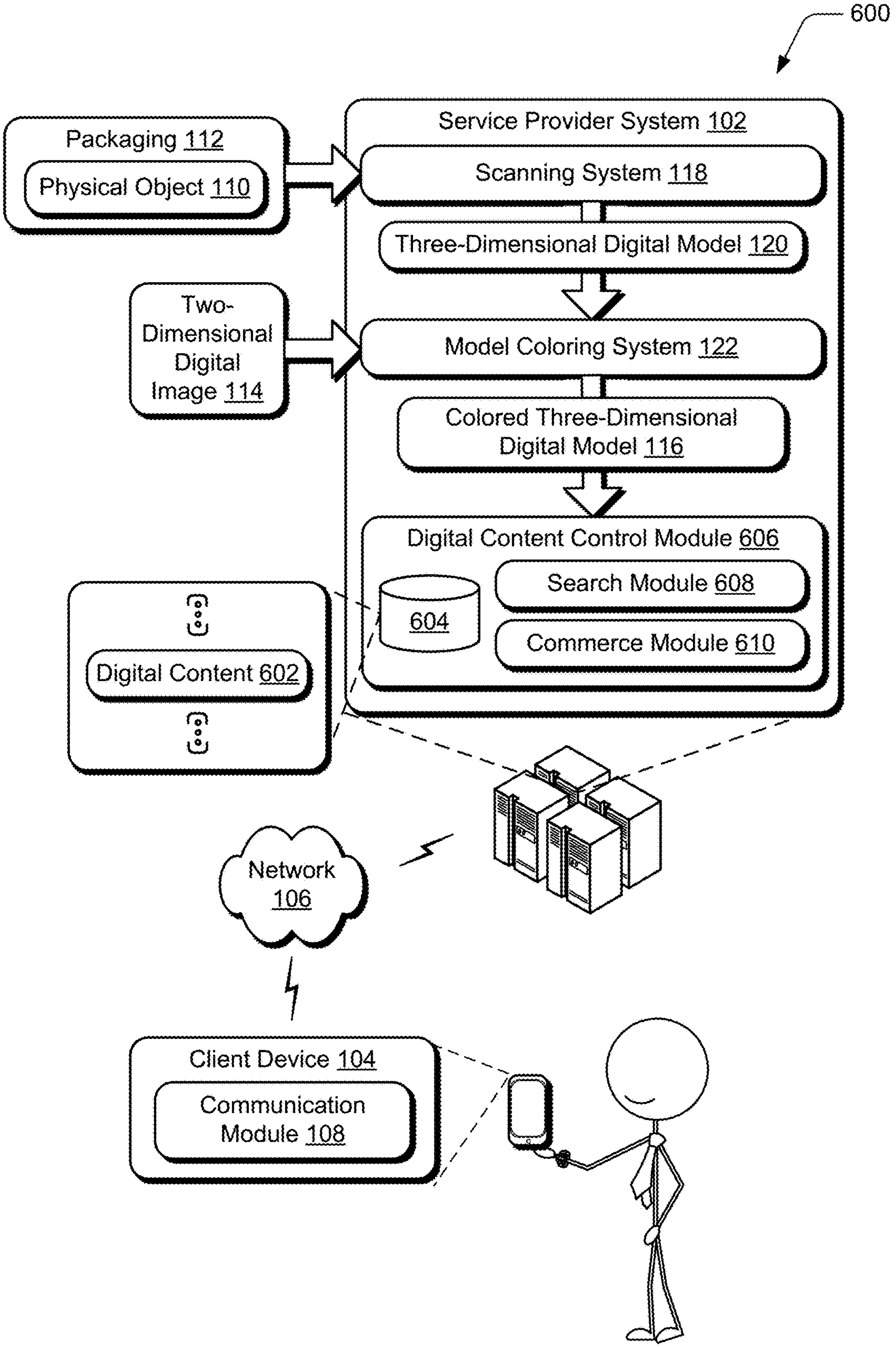
FIG. 6 depicts generation of digital content as including the three-dimensional digital model of FIG. 5.

FIG. 6 depicts an example implementation 600 in which the colored three-dimensional digital model 116 is incorporated as part of digital content. A user, for instance, may wish to offer the physical object 110 for sale. To do so, the seller interacts with the service provider system 102 over the network 106 using a client device 104 to initiate generation of digital content 602, which is illustrated as stored in a storage device 604. The digital content 602 in this example is a webpage indicating the physical object 110 is available for sale, a two-dimensional digital image 114 of the same or similar physical object, a purchase price, and includes functionality that is selectable by a buyer to initiate purchase of the physical object 110.

The user in this example ships the physical object 110, within the packaging 112, to a fulfillment center of the service provider system 102. The fulfillment center includes a scanning system 118 including a three-dimensional scanning device 202 that is usable to generate a three-dimensional digital model. The three-dimensional scanning device 202 is configured to generate scanning data 206. The scanning data 206 is used to form the model by a three-dimensional digital model generation module 208 without removing the physical object 110 from the packaging 112, thus preserving human and operational resources as well as preserving potentially desirable packaging.

A model coloring system 122 is then used to color the three-dimensional digital model 120 based at least in part on the two-dimensional digital image 114 supplied by the user. In this way, a colored three-dimensional digital model 116 may be readily generated for inclusion as part of the digital content 602, e.g., the offer to sell the physical object. As a result, the digital content 602 may include a colored three-dimensional digital model without removing the physical object from the packaging, which is not possible using conventional techniques.

The service provider system 102, for instance, may include a digital content control module 606 that is configured to manage output of the digital content 602. This may include use of a search module 608 that is configured to perform searches, whether keyword or image based, for digital content 602, e.g., to locate prospective items for purchase. The digital content control module 606 may also include a commerce module 610 representative of functionality to process payment information to initiate and complete a purchase of the physical object 110.

Figure 7A:
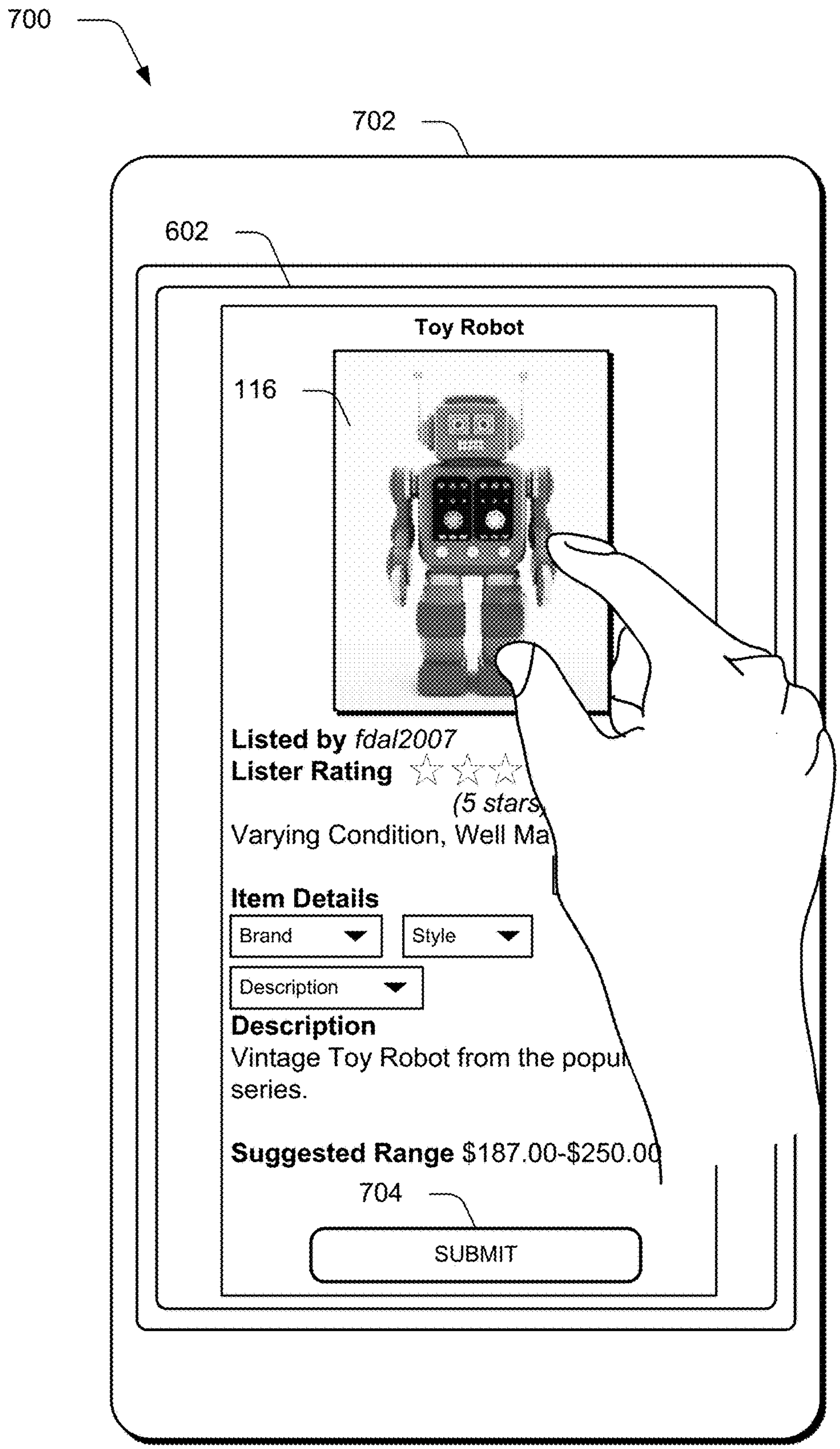
FIG. 7A depicts an example of the digital content that includes the three-dimensional digital model of FIG. 6.
Figure 8:
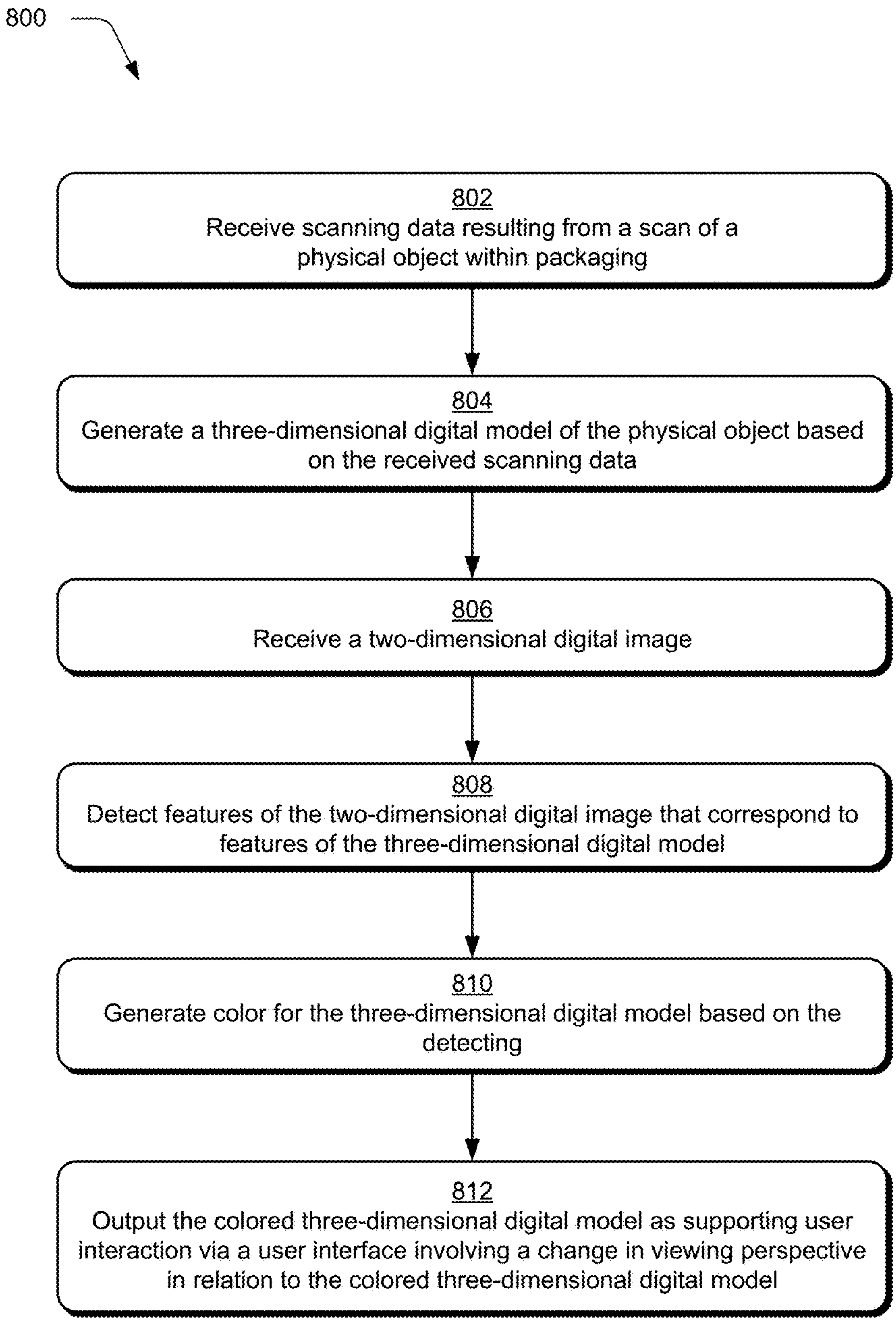
FIG. 8 is a flow diagram depicting a procedure in an example implementation of colored three-dimensional digital model generation.

FIG. 7A depicts an example implementation 700 of output of the digital content 602 as including the colored three-dimensional digital model 116. In the illustrated example, a client device 702 outputs a user interface that includes the digital content 602, e.g., via execution of a browser, a mobile application, and so forth. The digital content 602 includes the colored three-dimensional digital model 116 that supports user interaction via gestures (e.g., select-and-drag) to change perspectives (i.e., viewing angles) of the modeled physical object. The digital content 602 also includes functionality 704 to initiate a purchase of the physical object. In this way, functionality and richness of user interaction with the digital content 602 may be increased overcome the limitations of conventional techniques.

Figure 7B:
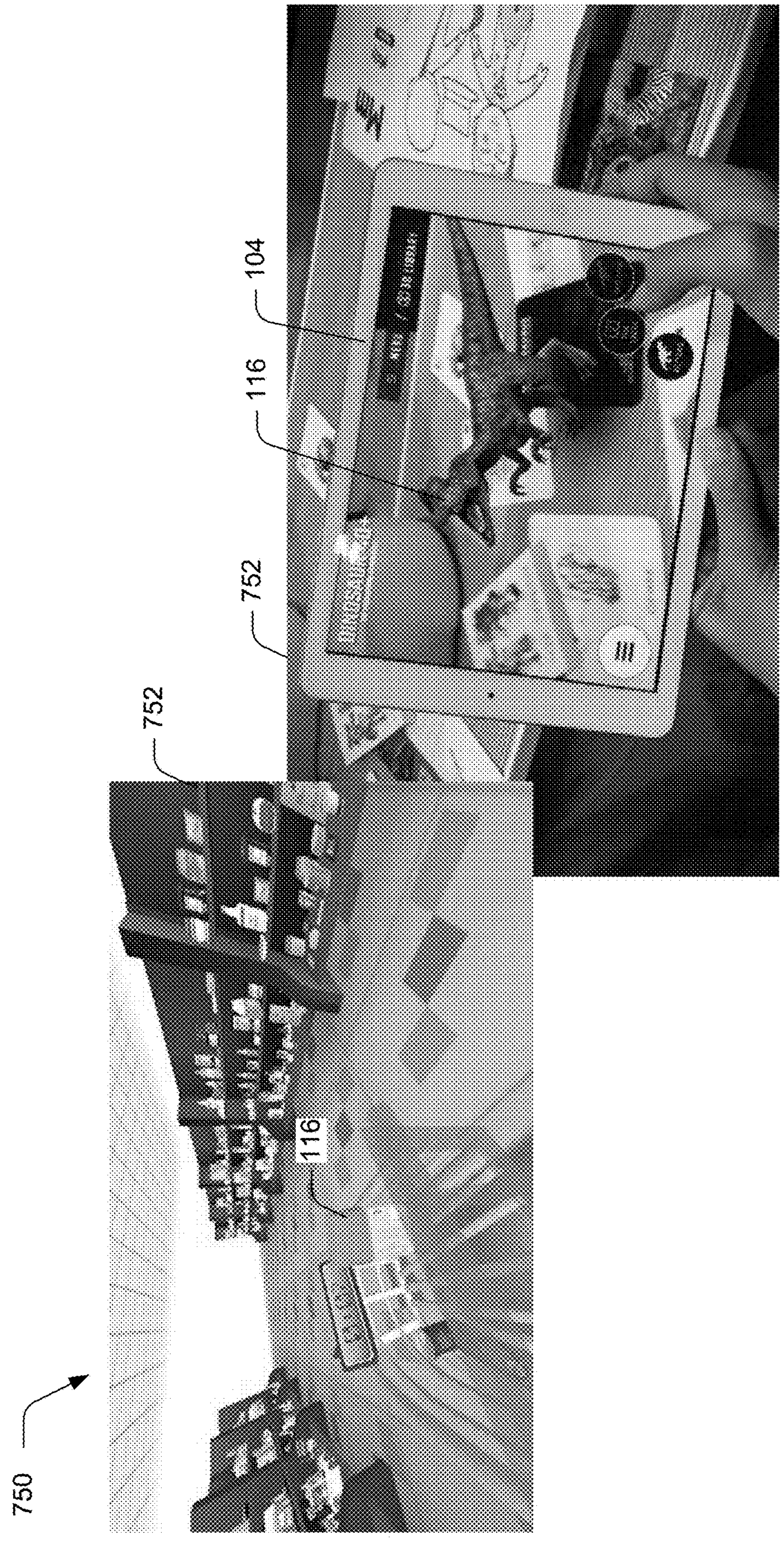
FIG. 7B depicts another example implementation of output of the digital content in virtual and augmented reality scenarios.

FIG. 7B depicts another example implementation 750 of output of the digital content in virtual and augmented reality scenarios. In a first example 752, the colored three-dimensional digital model 116 is output as virtual reality digital content as part of a virtual store. In this way, a user may navigate through the store and interaction with the colored three-dimensional digital model 116 in a natural and intuitive way. In a second example 752, the colored three-dimensional digital model 116 is output as augmented reality content that is viewable as placed on a surface of an environment of a user through the client device 104. A variety of other examples are also contemplated.

Return will now be made again to FIG. 6, as previously described the digital content control module 606 is configured to maintain the colored three-dimensional digital models 116. In one example, this includes generation of a repository of models that may be used without rescanning physical objects 110. The colored three-dimensional digital models 116, for instance, may be located using a search module 608 based on a keyword description or two-dimensional digital image 114 provided by a user to generate the digital content 602. These models may also be leveraged to support output in virtual and augmented reality scenarios, e.g., as part of a virtual shopping service. Other examples are also contemplated.

Example System and Device

Figure 9:
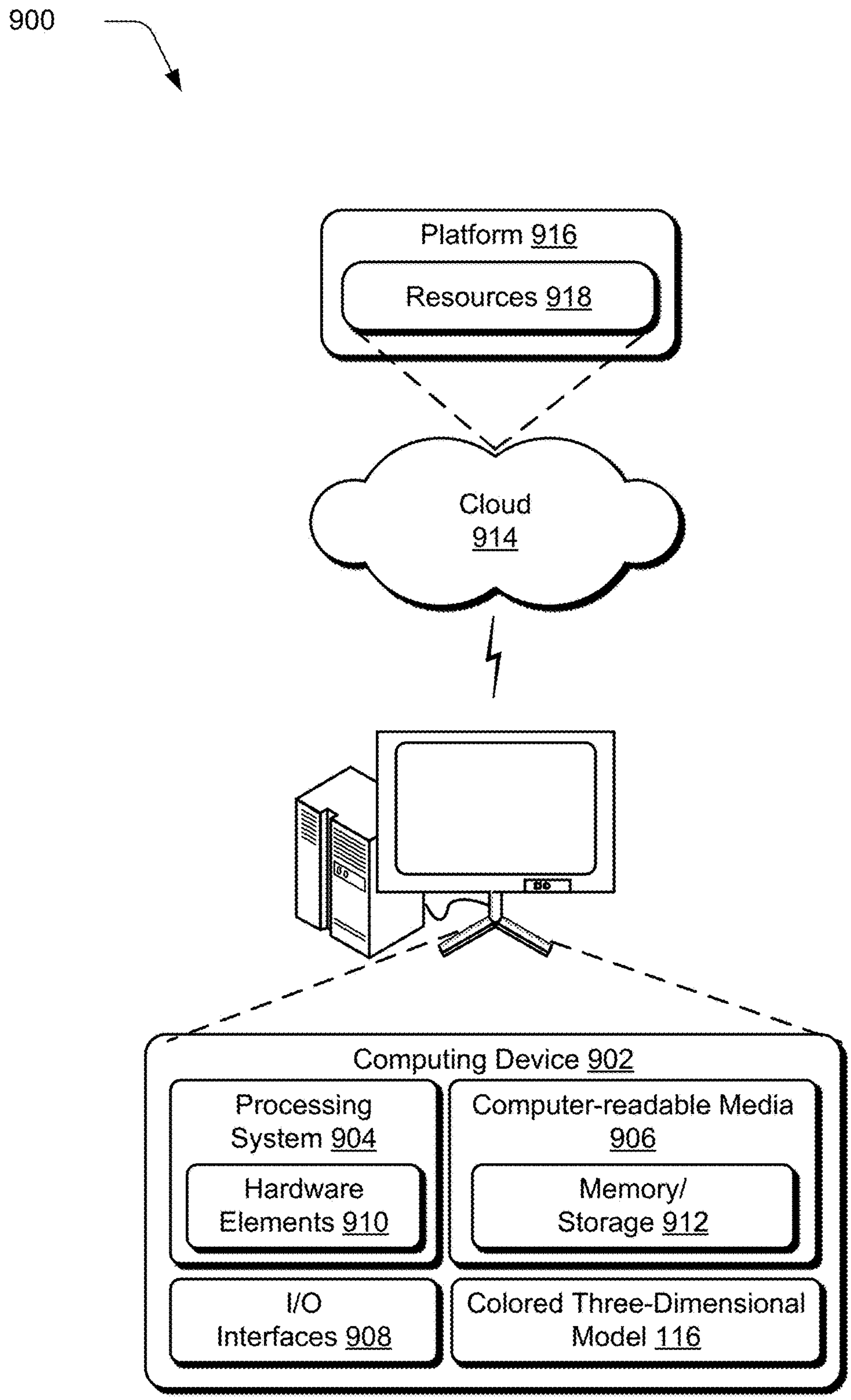
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the colored three-dimensional digital model 116. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a computing device, scanning data resulting from a scan by a scanner through packaging of a first object contained within the packaging, the scanner located outside of the packaging, the scan performed by the scanner through the packaging of the first object contained within the packaging;

generating, by the computing device, an uncolored three-dimensional digital model of the first object based on the scanning data received;

receiving, by the computing device, a two-dimensional digital image depicting a second object, in which the second object is distinct from and similar to the first object contained within the packaging;

generating, by the computing device, mapped feature data by detecting features of the second object and corresponding features of the first object contained within the packaging using blob detection that detects:

one or more blobs of the second object corresponding to one or more regions of structure included in the two-dimensional digital image; and one or more corresponding blobs of the first object corresponding to one or more corresponding regions of the first object;

based on the mapped feature data, modifying, by the computing device, the uncolored three-dimensional digital model of the first object; and outputting, by the computing device, the uncolored three-dimensional digital model via a user interface without removing the first object contained within the packaging from the packaging.

2. The method as described in claim 1, wherein the scan is an X-ray scan.

3. The method as described in claim 1, wherein the uncolored three-dimensional digital model represents the first object without the packaging.

4. The method as described in claim 1, wherein the first object has a density that is greater than a density of the packaging.

5. The method as described in claim 1, further comprising generating, by the computing device, digital content including the uncolored three-dimensional digital model.

6. The method as described in claim 1, further comprising:

generating, by the computing device, color for the uncolored three-dimensional digital model based on the mapped feature data; and outputting, by the computing device, a colored three-dimensional digital model via a user interface without removing the first object contained within the packaging from the packaging.

7. The method as described in claim 6, wherein the generating includes:

generating an initially colored three-dimensional digital model including colored features that correspond to features of the two-dimensional digital image; and generating color for at least one portion of the uncolored three-dimensional digital model that is not colored in the initially colored three-dimensional digital model to form the colored three-dimensional digital model generated.

8. The method as described in claim 7, wherein the generating of the color for the at least one portion that is not colored is based on detecting a different portion of the initially colored three-dimensional digital model as corresponding to the at least one portion.

9. The method as described in claim 7, wherein the generating of the color for the at least one portion that is not colored is based on stretching color from another portion of the initially colored three-dimensional digital model as supplying the color for the at least one portion.

10. The method as described in claim 6, wherein the generating of the color includes linear blend skinning of the two-dimensional digital image to the uncolored three-dimensional digital model.

11. The method as described in claim 6, wherein the generating of the color includes stretching a portion of the two-dimensional digital image and compressing another portion of the two-dimensional digital image to align a perspective of the uncolored three-dimensional digital model to a perspective of the second object depicted in the two-dimensional digital image.

12. The method as described in claim 6, further comprising generating digital content as including the colored three-dimensional digital model.

13. The method as described in claim 12, wherein the digital content is a webpage.

14. The method as described in claim 1, further comprising generating, by the computing device, a search query based on the uncolored three-dimensional digital model.

15. The method as described in claim 1, wherein the mapped feature data includes correspondence between the one or more blobs of the second object and the one or more corresponding blobs of the first object.

16. The method as described in claim 1, wherein a blob provides a description of structure included in the two-dimensional digital image as a region and contrasts with a corner.

17. A system comprising:

a memory component; and a processing device coupled to the memory component, the processing device to perform operations comprising:

receiving scanning data resulting from a scan by a scanner through packaging of a first object contained within the packaging, the scanner located outside of the packaging, the scan performed by the scanner through the packaging of the first object contained within the packaging;

generating an uncolored three-dimensional digital model of the first object based on the scanning data received;

receiving a two-dimensional digital image depicting a second object, in which the second object is distinct from and similar to the first object contained within the packaging;

generating mapped feature data by detecting features of the second object and corresponding features of the first object contained within the packaging using blob detection that detects:

one or more blobs of the second object corresponding to one or more regions of structure included in the two-dimensional digital image; and one or more corresponding blobs of the first object corresponding to one or more corresponding regions of the first object;

based on the mapped feature data, modifying the uncolored three-dimensional digital model of the first object; and outputting the uncolored three-dimensional digital model via a user interface without removing the first object contained within the packaging from the packaging.

18. The system as described in claim 17, wherein the uncolored three-dimensional digital model represents the first object without the packaging.

19. The system as described in claim 17, wherein a blob provides a description of structure included in the two-dimensional digital image as a region and contrasts with a corner.

20. A non-transitory computer-readable storage medium storing executable instructions, which when executed by a processing device, cause the processing device to perform operations comprising:

receiving scanning data resulting from a scan by a scanner through packaging of a first object contained within the packaging, the scanner located outside of the packaging, the scan performed by the scanner through the packaging of the first object contained within the packaging;

generating an uncolored three-dimensional digital model of the first object based on the scanning data received;

receiving a two-dimensional digital image depicting a second object, in which the second object is distinct from and similar to the first object contained within the packaging;

generating mapped feature data by detecting features of the second object and corresponding features of the first object contained within the packaging using blob detection that detects:

one or more blobs of the second object corresponding to one or more regions of structure included in the two-dimensional digital image; and one or more corresponding blobs of the first object corresponding to one or more corresponding regions of the first object;

based on the mapped feature data, modifying the uncolored three-dimensional digital model of the first object; and outputting the uncolored three-dimensional digital model via a user interface without removing the first object contained within the packaging from the packaging.

* * * * *